(12) United States Patent
Weinberger et al.

(10) Patent No.: US 11,995,217 B2
(45) Date of Patent: *May 28, 2024

(54) DATA INTEGRITY

(71) Applicant: Google LLC, Mountain View, CA (US)

(72) Inventors: Arthur Weinberger, Santa Clara, CA (US); Aaron Malenfant, Redwood City, CA (US); Jason Fedor, Sunnyvale, CA (US); Jackson Roberts, Seattle, WA (US); Madhu Kallazhi Vasu, Saratoga, CA (US); Bradley D. Townsend, Irvine, CA (US); Breen Baker, Redwood City, CA (US); John Charles Simone, Sunnyvale, CA (US); Ronak Parpani, San Francisco, CA (US); Sean Michael Harrison, Seattle, WA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/330,596

(22) Filed: Jun. 7, 2023

(65) Prior Publication Data

US 2023/0351052 A1 Nov. 2, 2023

Related U.S. Application Data

(63) Continuation of application No. 17/495,304, filed on Oct. 6, 2021, now Pat. No. 11,709,968, which is a
(Continued)

(51) Int. Cl.
*G06F 21/64* (2013.01)
*G06F 21/60* (2013.01)
*H04L 9/32* (2006.01)

(52) U.S. Cl.
CPC ............ *G06F 21/64* (2013.01); *G06F 21/602* (2013.01); *H04L 9/3213* (2013.01)

(58) Field of Classification Search
CPC ....... G06F 21/64; G06F 21/602; H04L 9/3213
See application file for complete search history.

(56) References Cited

U.S. PATENT DOCUMENTS 7,680,891 B1 3/2010 Pongsajapan
8,880,541 B2 9/2014 Hill et al.
(Continued)

FOREIGN PATENT DOCUMENTS

AU 2017306939 3/2019
WO WO 2014014232 1/2014
(Continued)

*Primary Examiner* — Ayoub Alata
(74) *Attorney, Agent, or Firm* — Fish & Richardson P.C.

(57) ABSTRACT

Methods, systems, and apparatus, including computer programs encoded on a computer storage medium, that protect analytics for resources of a publisher from traffic directed to such resources by malicious entities. An analytics server receives a first message that includes an encrypted token and analytics data for a publisher-provided resource. The token includes a portion of the analytics data and a trust score indicating a likelihood that activity on the resource is attributed to a human (rather than an automated process). The analytics server decrypts the token. The analytics server determines a trustworthiness measure for the analytics data included in the first message based on the trust score (in the decrypted token) and a comparison of the analytics data in the first message and the portion of the analytics data (in the decrypted token). Based on the measure of trustworthiness, the analytics server performs analytics operations using the analytics data.

20 Claims, 4 Drawing Sheets

Related U.S. Application Data continuation of application No. 16/426,592, filed on May 30, 2019, now Pat. No. 11,170,132.

(56) References Cited

U.S. PATENT DOCUMENTS

| | | |
|---|---|---|
| 9,003,552 B2 | 4/2015 | Goodwin et al. |
| 11,170,132 B2 | 11/2021 | Weinberger et al. |
| 2008/0183745 A1 | 7/2008 | Cancel et al. |
| 2008/0189254 A1 | 8/2008 | Cancel et al. |
| 2013/0305378 A1* | 11/2013 | Johnson .................. G06F 21/31 726/26 |
| 2014/0259116 A1* | 9/2014 | Birk ........................ G06F 21/31 726/4 |
| 2015/0089568 A1* | 3/2015 | Sprague ............. H04L 63/0853 726/1 |
| 2016/0055490 A1 | 2/2016 | Keren et al. |
| 2016/0188866 A1* | 6/2016 | Xie ........................ G06F 21/36 726/29 |
| 2017/0053215 A1 | 2/2017 | Attengerg et al. |
| 2018/0165364 A1* | 6/2018 | Mehta ....................... G06F 9/54 |
| 2020/0380172 A1 | 12/2020 | Parpani et al. |

FOREIGN PATENT DOCUMENTS

| | | |
|---|---|---|
| WO | WO 2015039473 | 3/2015 |
| WO | WO 2015047992 | 4/2015 |
| WO | WO 2018106974 | 6/2018 |

* cited by examiner

DATA INTEGRITY

CROSS-REFERENCE TO RELATED APPLICATIONS

This application is a continuation application of, and claims priority to, U.S. patent application Ser. No. 17/495,304, filed on Oct. 6, 2021, which is a continuation application of U.S. patent application Ser. No. 16/426,592, filed on May 30, 2019, now U.S. Pat. No. 11,170,132. The disclosure of the foregoing applications are incorporated herein by reference in its entirety for all purposes.

BACKGROUND

This specification relates to data processing and protecting data integrity.

A publisher's resource (e.g., website, native application, analytics servers) can receive traffic not only from human users, but also from malicious entities (e.g., spammers, hackers) that generally use automated computing processes (e.g., bots) to access and interact with the resource. Such malicious entities often access and interact with the publisher's website for their own gain.

Such activities and interactions by malicious entities on a publisher's website are generally referred to as spam. An example of a type of spam received by a publisher's website is known as referral spam. To orchestrate referral spam, a malicious entity use bots to send fake hypertext transfer protocol (HTTP) requests to a publisher's website with a fake referrer header (i.e., a referrer header that misleadingly appears to be associated with a legitimate source) that includes the uniform resource locator (URL) for the website that the malicious entity wants to promote. These spam requests will be included along with authentic requests received from human users in the analytics data for the publisher's resource. As such, a publisher may not be able to discern the authentic human traffic that its resource is receiving. As a result, the publisher may not only inadvertently visit these URLs included in the spam requests, it may also make decisions based on the analytics data that do not properly account for the spam requests in the data. For example, if the analytics data shows a significant amount of activity on the publisher's website, the publisher can decide to pare back some of its web marketing activities. However, if the publisher could discern from the analytics data that 90% of the requests are spam requests, the publisher may actually increase—and not decrease—its web marketing activities.

SUMMARY

In general, one aspect of the subject matter described in this specification can be embodied in methods that include the operations of receiving, from a user device, a first message that includes a token and analytics data for a resource provided by a publisher, wherein: the token includes a second message comprising (i) a trust score that indicates a likelihood that user activity on the resource is attributed to a human rather than an automated computer process and (ii) a portion of the analytics data; the token is encrypted using a first cryptographic key; decrypting the token using a second cryptographic key to obtain the second message; determining a measure of trustworthiness for the analytics data in the first message based on (1) the trust score and (2) a comparison of the analytics data in the first message and the portion of the analytics data in the second message; and performing analytics operations using the analytics data in the first message based on the measure of trustworthiness. Other embodiments of this aspect may include corresponding systems, devices, apparatus, and computer programs configured to perform the actions of the methods. The computer programs (e.g., instructions) can be encoded on computer storage devices. These and other embodiments can each optionally include one or more of the following features.

In some implementations, the portion of the analytics data in the second message can include a first client identifier and a first session identifier, and the analytics data in the first message can include a second client identifier and a second session identifier.

In some implementations, the comparison of the analytics data in the first message and the portion of the analytics data in the second message, can include determining whether the first client identifier matches the second client identifier and whether the first session identifier matches the second session identifier.

In some implementations, the trust score in the second message can be generated using a reCAPTCHA algorithm.

In some implementations, methods can include the operation of determining that the measure of trustworthiness for the analytics data in the first message does not satisfy a threshold; and in response to determining that the measure of trustworthiness for the analytics event data in the first message does not satisfy the threshold, identifying the analytics data in the first message as fraudulent.

In some implementations, performing analytics operations using the analytics data in the first message based on the measure of trustworthiness, can include generating a first analytics report for fraudulent data that is based on at least the analytics data identified as fraudulent; and generating a second analytics report using analytics data that is not identified as fraudulent and that is received from one or more other user devices, wherein the second analytics report is different from the first analytics report.

In some implementations, performing analytics operations using the analytics data in the first message based on the measure of trustworthiness, can include generating a third analytics report using only analytics data received from one or more user devices that is not identified as fraudulent, wherein the third analytics report does not include the analytics data in the first message that was identified as fraudulent.

In some implementations, the methods can include the operations of receiving, from a user device, a third message that includes analytics data for the resource, wherein the third message does not include a token with (i) a trust score that indicates a likelihood that user activity on the resource is attributed to a human rather than an automated computer process and (ii) a portion of the analytics data; determining that the third message does not include the token; and in response to determining that the third message does not include the token, identifying the analytics data in the third message as fraudulent.

Particular embodiments of the subject matter described in this specification can be implemented to protect analytics data from the traffic that is directed to the publisher's resources by malicious entities. Various embodiments described in this specification can discern the authentic traffic (i.e., human traffic) from fraudulent traffic (i.e., traffic sent by malicious entities) in the analytics data for its website. As a result, a publisher can make more informed decisions that account for such authentic and spam data. For example, a publisher can decide to use data about the authentic traffic to adjust its marketing or to offer different types of content. As another example, a publisher can use data about the spam traffic to take measures (e.g., adjust design of its website) to reduce such spam traffic.

The techniques discussed herein also improve the performance of computer systems by reducing the amount of analytics data that needs to be processed and improves the accuracy of metrics generated by the computer systems. For example, the identification of the fraudulent traffic enables the system to ignore (or filter out) fraudulent traffic from the analytics data, thereby reducing the amount of analytics data that is processed, removing metric skew that can be caused by the fraudulent traffic, and preventing unnecessary transmission of data determined from the fraudulent traffic.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
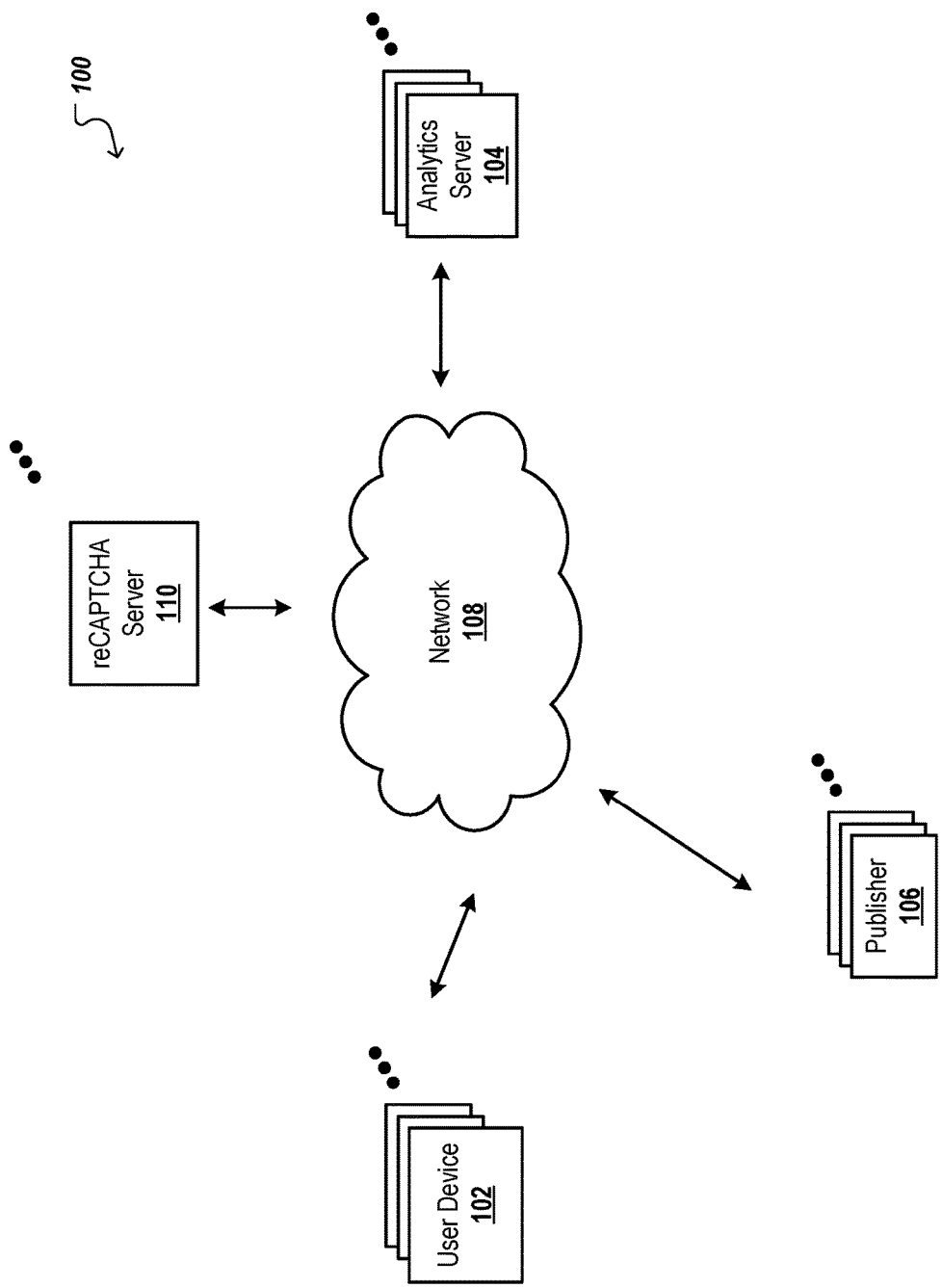
FIG. 1 is a block diagram of an example environment in which content is distributed for presentation.

This description refers to protecting analytics for a publisher's resource from fraudulent traffic directed to such applications by malicious entities. However, it should be understood that the techniques discussed herein can be applied in other scenarios to distinguish between authentic activity and fraudulent activity.

A publisher can use analytics data, which includes, for example, data about the device's environment as well as legitimate user activity and interactions on the publisher's resource (e.g., website) to make decisions about the resource (e.g., modify content provided on its website, adjust marketing activities, etc.).

When a user uses an application (e.g., browser, native application) to access a publisher's resource, such as a page of a publisher's website, a script on the page executes and collects analytics data. The analytics data also includes identification data in the form of a client identifier and a session identifier.

The user device sends this analytics data to a reCAPTCHA server, which evaluates whether the activity on the publisher page can be attributed to a human user or an automated computer process (e.g., an automated bot). The reCAPTCHA server extracts the identification data from the received analytics data. Subsequently, the reCAPTCHA server interacts with the user device via the user application (e.g., browser, native application) to generate a reCAPTCHA score (which generally ranges from zero to one) that indicates a likelihood that the activity on the resource can be attributed to a human user as opposed to bot interactions. The reCAPTCHA server sends the reCAPTCHA score and the identification data in an encrypted token to the user device. The user device in turn sends the encrypted token along with analytics data to an analytics server that decrypts, stores, analyzes, and performs analytics operations (e.g., generates reports based on the analytics data) on the analytics data.

In some implementations, prior to the analytics server performing analysis or analytics operations on the analytics data, it first determines whether the analytics data is attributed to a human user or an automated computer process (e.g., a bot). To accomplish this, the analytics server decrypts the received token and determines the identification data included in the decrypted token. The analytics server then determines a measure of trustworthiness (e.g., a score ranging from zero to one, a binary identification as "human" or "fraudulent") for the analytics data. The analytics server determines this measure of trustworthiness based on the reCAPTCHA score included in the decrypted token and a comparison of the identification data in the decrypted token with the identification data in the analytics data sent by the user device. If the identification data in the decrypted token does not match the identification data in the analytics data sent by the user device, the analytics server identifies the analytics data as fraudulent (or assigns a score of zero, indicating that the analytics data cannot be attributed to a human user). If the identification data in the decrypted token matches the identification data in the analytics data sent by the user device, the analytics server assigns the reCAPTCHA score (which generally ranges from zero to one) to the analytics data (or alternatively, assigns a "human" or "fraudulent" identifier to the analytics data based on whether the reCAPTCHA score satisfies a certain threshold score). The analytics server stores the received analytics data along with the measure of trustworthiness.

When the publisher requests certain analytics operations (e.g., perform calculations on the analytics data, generate reports using the analytics data), the analytics server performs these operations using the analytics data and the corresponding measures of trustworthiness. For example, if a publisher requests a certain report, the analytics server can generate two reports: one based on analytics data that is identified as "human" (or with a score that satisfies a certain threshold) and another based on analytics data that is identified as "fraudulent" (or with a score that does not satisfy a certain threshold). As another example, the analytics server can generate a single report that only uses analytics data that is identified as "human" (or with a score that satisfies a certain threshold).

These features and additional features are described in more detail below with reference to FIGS. 1-4.

Further to the descriptions throughout this document, a user may be provided with controls allowing the user to make an election as to both if and when systems, programs, or features described herein may enable collection of user information (e.g., information about a user's social network, social actions, or activities, profession, a user's preferences, or a user's current location), and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

FIG. 1 is a block diagram of an example environment 100 in which content is distributed for presentation. The example environment 100 includes a network 108, such as a local area network (LAN), a wide area network (WAN), the Internet, or a combination thereof. The network 108 connects user devices 102, publishers 106, analytics servers 104, and reCAPTCHA servers 110. The example environment 100 may include many different analytics servers 104, and reCAPTCHA servers 110, publishers 106, and user devices 102.

A user device 102 is an electronic device that is capable of requesting and receiving content over the network 108. Example user devices 102 include personal computers, mobile communication devices, digital assistant devices, and other devices that can send and receive data over the network 108. A user device 102 typically includes a user application, such as a web browser, to facilitate the sending and receiving of data over the network 108, but native applications executed by the user device 102 can also facilitate the sending and receiving of content over the network 108. Examples of content presented at a user device 102 include webpages, word processing documents, portable document format (PDF) documents, images, videos, applications, games, and search results pages.

A publisher 106 is a computing platform that enables distribution of content. Example publishers 106 include search engines, social media platforms, news platforms, data aggregator platforms, or other content sharing platforms. Each publisher 106 may be operated by a publisher service provider.

The publisher 106 can publish and provide its own or third party content on a publisher resource (e.g., content pages of a website, pages of a native application) that may be accessed on an application (e.g., a browser, a native application) operating on a user device 102. For example, the publisher 106 may be a news platform, which publishes its own news articles. As another example, the publisher 106 may be a data aggregator platform that does not publish any of its own content, but aggregates and present news articles provided by different news websites.

Publishers 106 may want to analyze the traffic for their resources (e.g., website) to make decisions that can, for example, improve accessibility of the publisher's resource, such as its website. To accomplish this, the publisher 106 can analyze analytics data collected by an analytics server 104 for the publisher's resource.

The analytics server 104 is a computing platform that collects data about a device's environment as well as the activity and interactions on one or more pages of a publisher 106's website. This type of data will be referred to in this specification as analytics data. Examples of analytics data include, among others, a user identifier, a session identifier, the language of the browser, the device type (e.g., mobile or desktop), the device's screen resolution, the location of the device, the pages visited on the website, elements/events (e.g., buttons, videos on a page) that were interacted with, and transactions (e.g., products purchased, quantity purchased) completed.

Analytics data can be obtained by, for example, inserting a script on one or more pages of a publisher's website. Subsequently, when a user device 102 accesses the publisher 106's web site, the script on the visited page(s) executes, which then obtains data about the device's environment as well as the interactions and activity on the page.

The user device 102 sends this analytics data for storage to the analytics server 104. Using the stored analytics data, the analytics server 104 can perform different types of reporting and analysis, which the publisher 106 can then use to make different decisions. In some implementations, the analytics server 104 can provide reports on the various types of interactions on the publisher's applications and website. In some implementations, the analytics server 104 can also provide reports on business performance and metrics that show how the activity and interactions on the publishers 106's website is affecting the publisher's 106 business. For example, the analytics server 104 can use the analytics data to generate report about the revenues generated on the publisher's web site over different time intervals. It will be appreciated that the analytics server 104 can provide additional reports and perform additional analysis on the analytics data.

The environment 100 also includes one or more reCAPTCHA servers 110. The reCAPTCHA server 110 is a computing platform that evaluates whether activity and interactions on a resource of a publisher 106 can be attributed to a human user or an automated computer process, such as a bot. The reCAPTCHA server 110 uses a reCAPTCHA algorithm to determine whether the activity on a website can be attributed to a human user or an automated computer process. Alternatively, and instead of using a reCAPTCHA algorithm, the reCAPTCHA server 110 can use a conventional risk analysis algorithm that can evaluate whether activity on the resource can be attributed to a human user or whether that activity is attributable to an automated computer process rather than a human user.

When a user device 102 accesses a publisher's 106 resource, the reCAPTCHA server 110 interrogates the user device 102 via the user application to determine whether the activity on the publisher 106's resource is associated with a human user or an automated computer process. Based on this interrogation, the reCAPTCHA server 110 (using its reCAPTCHA algorithm or another suitable risk analysis algorithm) generates a score that provides a likelihood of whether the activity can be attributed to a human user. The score can be a numerical score within a range, e.g., from zero to one, where one represents that the activity is attributed to a human, while zero represents that the activity cannot be attributed to a human. Alternatively, the score could simply identify tags such as "Human" for activity that is attributed to a human and "Fraudulent" for activity that is attributed to an automated computer process. As described further with reference to FIGS. 2 and 3, the score generated by the reCAPTCHA server 110 can also be used to protect the analytics data from traffic directed to the publisher 106's resource by malicious entities.

Figure 2:
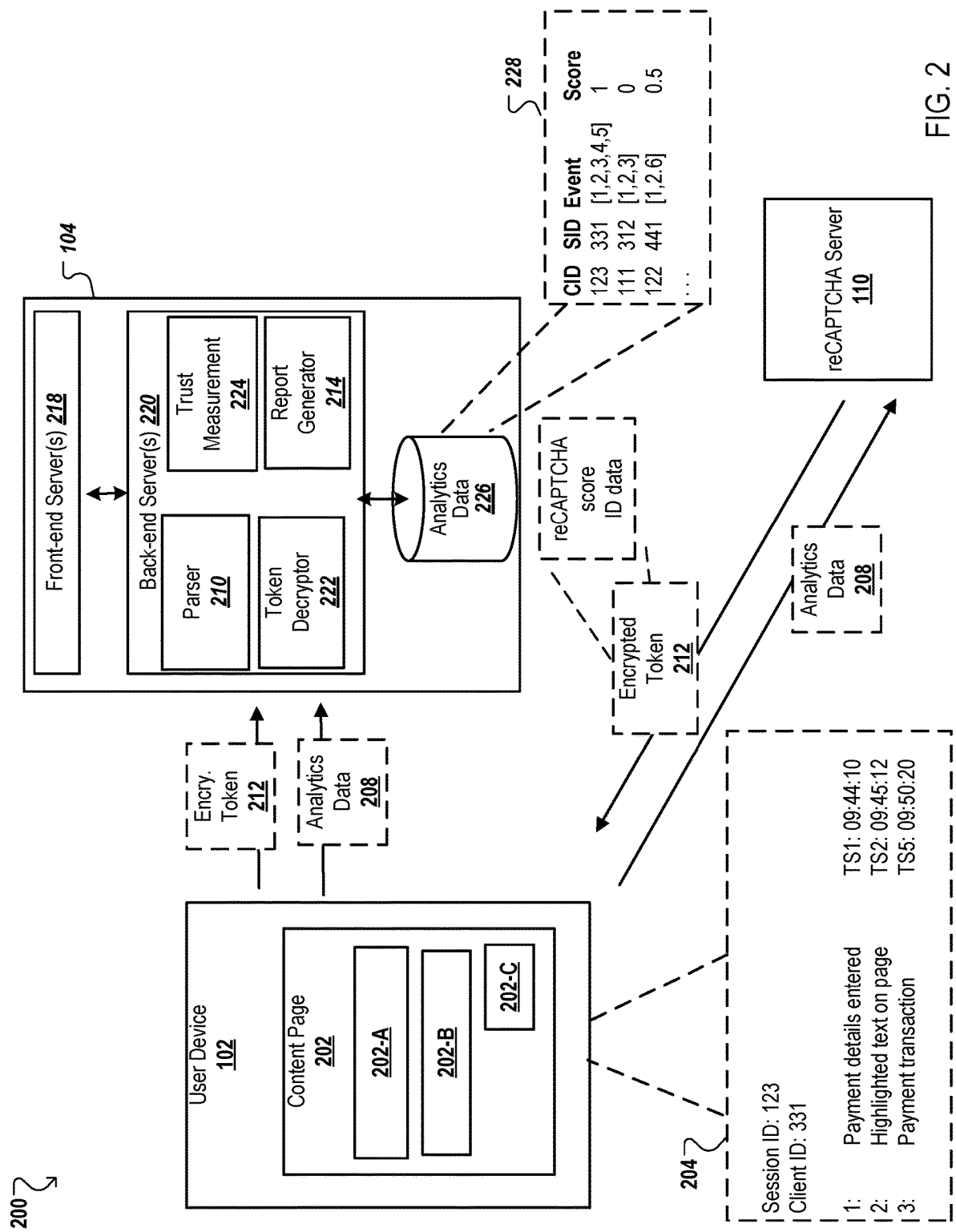
FIG. 2 is a block diagram that illustrates the structure and operations of the different components of FIG. 1 that are used in identifying spam or fraudulent data in analytics data.

FIG. 2 is a block diagram that illustrates the structure and operations of the different components of FIG. 1 that are used in identifying spam or fraudulent data in analytics data.

A user device 102 can access a publisher 106's website using an application, such as a browser. This results in the browser on the user device 102 presenting a content page 202 that is provided by the publisher 106. The content page 202 can also be provided by a mobile application that runs on the user device 102

For example, the content page 202 is a page where money can be donated to charity. The content page 202 includes different user interface elements, such as a form 202-A, a text portion 202-B, and a submit button 202-C. In the form 202-A, the user inserts payment details. The text portion 202-B is a disclaimer, which the user can spend some time reviewing. The user selects (e.g., using a mouse) a few sentences of the disclaimer to copy and paste into a word editor. Subsequently, the user presses a button 202-C that submits the payment information for processing. If the transaction is successful, a different content page is presented confirming that the transaction was successful.

The publisher 106 includes a script on the content page 202, as described above with reference to FIG. 1. Thus, when the user accesses content page 202, the script executes and can, for example, generate a cookie that is stored in the application (e.g., browser) that the user is using. The cookie obtains data about the device's environment as well as the activity and interactions on the website. Based on the above-described activity and interactions on the content page 202, the cookie obtains three actions as well as timestamps for when those actions were performed, as shown in data record 204. In particular, and as shown in data record 204, the cookie collects data about (1) payment details in the form 202-A, (2) highlighted text on the page, and (3) the completion of a payment transaction.

As shown in data record 204, this information is associated with a client identifier and a session identifier (which will also be collectively referred to as identification data in this specification). The client identifier is a unique identifier associated with the cookie that is stored in the browser. This is referred to as Client ID in data record 204. The session identifier is an identifier that is assigned to the analytics data that is collected during the period that the user (with a particular client ID) is accessing one or more pages of the publisher 106's website. In some implementations, the session identifier can be a numeric ID as shown in FIG. 2. In some implementations, the session identifier may be a combination of the user identifier (also referred to as the client identifier, client ID, or visitor identifier), the analytics property (also referred to as tracking identifier or TID), the website hostname, and the timestamp. The client identifier, the session identifier, and the activity and interactions together make up the analytics data 208.

The user's application sends the analytics data 208 to the reCAPTCHA server 110. The reCAPTCHA server 110 identifies the session identifier and the client identifier from the analytics data 208. In some implementations, the analytics data includes data separated by tags, which in this case may be, "CID" and "SID." In such implementations, the reCAPTCHA server 110 searches for these tags to identify and separate out the client identifier and the session identifier from the analytics data. In some implementations, the analytics data 208 sent to reCAPTCHA 110 from the user device 102 is only a portion of the analytics data 208 sent to analytics servers 104. For example, the user device 102 can send the identification data to the reCAPTCHA server 110.

Subsequently, the reCAPTCHA server 110 can input the analytics data 208 (or the portion of the analytics data 208, such as the client identifier and the session identifier) into a reCAPTCHA algorithm (or another suitable risk analysis algorithm), which then generates a reCAPTCHA score. This score (which will also be referred to in this specification as a trust score) indicates a likelihood that the activity and interactions on the content page 202 can be attributed to a human user (as described above with reference to FIG. 1). Alternatively, instead of using the analytics data 208, the reCAPTCHA server 110 can interact with the application executing on the user device 102 to collect data about the activity on the content page 202 (e.g., mouse movements, keyboard button presses, navigation of the page, etc.). The reCAPTCHA server 110 inputs the collected data into a reCAPTCHA algorithm, which then generates a reCAPTCHA score. As described above with reference to FIG. 2, the reCAPTCHA server 110 can also use another risk analysis algorithm (other than the reCAPTCHA algorithm) that evaluates activities and interactions on a resource to generate a score that indicates whether the activities/interactions can be attributed to a human user or an automated computer process.

The reCAPTCHA server 110 generates a token 212 using the calculated reCAPTCHA score and the identification data (i.e., the session identifier and the client identifier). The reCAPTCHA server 110 encrypts this token using any conventional encryption algorithm. For example, the reCAPTCHA server 110 can use an asymmetric cryptographic algorithm, such as RSA, that can use a public key of the analytics server 110 to encrypt the identifying data. As another example, the reCAPTCHA server 110 can use a symmetric cryptographic algorithm, such as AES, to encrypt the identification data using its encryption key.

The reCAPTCHA server 110 sends this encrypted token 212 to the user device 102. Upon receiving the encrypted token 212, the user device 102 sends the encrypted token 212 along with the analytics data 208 to the analytics server 104.

As shown in FIG. 2, the analytics server 104 includes one or more front-end servers 218, one or more back-end servers 220, and one or more storage devices (e.g., an analytics data storage device 226). The front-end servers 218 can transmit data to, and receive data from, user devices 102 and publishers 106, over the network 108. For example, the front-end servers 218 can provide, to an application (e.g., browser, native application, etc.) executed by a publisher 106, interfaces and/or data for presentation with the interfaces. The front-end servers 218 can also receive data specifying the publisher 106's interactions with the interfaces of the application. The front-end servers 218 can update the interfaces, provide new interfaces, and/or update the data presented by the interfaces based on the publisher's interactions with the application.

The front-end servers 218 can also communicate with the back-end servers 220. For example, the front-end servers 218 can identify data to be processed by the back-end servers 220 (e.g., data specifying the analytics data to be retrieved that will be used to generate an analytics report) and provides the identified data to the back-end servers 220. The back-end servers 220 can obtain the necessary data (e.g., the analytics data for users of a publisher 106's website requested by the front-end server 218) from one or more storage devices, such as the analytics data storage device 226. The analytics data storage device 226 can include one or more databases (or other appropriate data storage structures) stored in one or more non-transitory data storage media (e.g., hard drive(s), flash memory, etc.). The back-end servers 220 can then send to the front-end servers 218, analytics data for the different users of the publisher 106's website. The front-end servers 218 can then transmit the data to the publisher 106 over the network 108.

The back-end servers 220 can include different components or engines, some of which are described below. As used herein, the term engine or component refers to a data processing apparatus, which can include hardware as well as software executing on hardware, that performs a set of tasks.

Upon receiving the message (which includes the encrypted token 212 and analytics data 208) from the user device 102, the analytics server 104 first parses the message to identify the token and the analytics data. In some implementations, the message received from the user device 102 includes data separated by tags, which in this case may be, "TOKEN" and "ANALYTICS DATA." In such implementations, the parser 210 searches for these tags to identify and separate out the token 212 from the analytics data 208 in the received message.

The parser 210 then sends the identified token to the token decryptor 222. The token decryptor 222 decrypts the token. In the above example, if the token was encrypted using the public-key of the analytics server 104, the token decryptor 222 decrypts the token using the private key of the analytics server 104. In the other example above where the token was encrypted using the encryption key of the reCAPTCHA server 110, the token decryptor 222 decrypts the token using this same key (which may have been previously provided to the analytics server 104). The token decryptor 222 sends the decrypted token to the parser 210.

The parser 210 uses the decrypted token and the analytics data 208 to identify the reCAPTCHA score and the identification data. In some implementations, the decrypted token may separate data using tags, which in this case, may be "Score" and "ID Data." The parser 210 searches for these tags to identify and separate out the reCAPTCHA score and the identification data. The parser 210 sends the identified reCAPTCHA score, the identification data, and the analytics data 208 to the trust measurement engine.

The trust measurement engine 224 uses the reCAPTCHA score and the identification data to determine whether the analytics data is generated by a human or by an automated computer process. The trust measurement engine 224 compares the identification data with the identification data in the analytics data 208. In some implementations, the trust measurement engine 224 determines whether (1) the client identifier within the decrypted token matches the client identifier included with the analytics data 208 and (2) the session identifier within the decrypted token matches the session identifier included with the analytics data 208.

If the trust measurement engine 224 does not find matching session identifiers and the client identifiers based on this comparison, the trust measurement engine 224 determines that the analytics data 208 provided with the token is fraudulent or spam. This scenario generally arises when a malicious entity tries to send spam data to an analytics server 104, for example, by acquiring a real token but sending that along with spam. In some implementations, the trust measurement engine 224 can store this analytics data in the analytics data storage device 226 along with an identifier that identifies this data as spam or fraudulent. As shown in FIG. 2, the analytics data storage device 226 stores a data structure 228 that includes the identification data (SID—session identifier, CID—client identifier), an array including the corresponding analytics data (which was received as analytics data 208), and a score that identifies the likelihood that the analytics data is attributed to a human. When the trust measurement engine 224 does not find matching session identifiers and the client identifiers based on the above-described comparison, the trust measurement engine 224 assigns a score of 0 to the stored analytics data. As described above, a score of zero represents that there is no likelihood that the analytics data can be attributed to a human. In some implementations, the trust measurement engine 224 can discard—instead of storing—the analytics data 208 in the analytics data storage device 226. In some implementations, instead of a score, the data structure 228 can store a binary value (fraudulent or human) or a categorical value (such as fraudulent, likely human, possibly human). In such implementations, if the identification data does not match based on the above-described comparison, the trust measurement engine 224 can store a "Fraudulent" tag along with the stored analytics data.

If the trust measurement engine 224 finds matching session identifiers and the client identifiers based on the above-described comparison, the trust measurement engine 224 stores the analytics data 208 (provided with the identification data) in the analytics data storage device 226 along with the reCAPTCHA score (as shown in data structure 228). In some implementations, the trust measurement engine 224 may only store analytics data when the reCAPTCHA score satisfies (e.g., meets or exceeds) a certain threshold (e.g., greater than zero, equal to or greater than 0.5). In some implementations, instead of a score, the data structure 228 can store a binary value (fraudulent or human) or a categorical value (such as fraudulent, likely human, possibly human). In such implementations, if the reCAPTCHA score does not satisfy (e.g., is less than or meets) a certain threshold, the trust measurement engine 224 can store a "Fraudulent" tag along with the stored analytics data. Conversely, if the reCAPTCHA score satisfies the threshold, the trust measurement engine 224 can store a "Human" tag along with the stored analytics data. In some implementations, the trust measurement engine 224 can discard—instead of storing—the analytics data 208 that has been identified as "Fraudulent" or below a certain score threshold.

In some scenarios, the user device 102 may not send an encrypted token 212. This may happen, for example, if a malicious entity is trying to send spam data directly to the analytics server 104. In such scenarios, the trust measurement engine 224 identifies the analytics data 208 received from the spammer as not being attributed to a human user. In some implementations, the trust measurement engine 224 can then store this analytics data 208 in the analytics storage device along with a score of 0 in the data structure 228 of the analytics data storage device 226. In some implementations, instead of a score, the data structure 228 can store a binary value (fraudulent or human) or a categorical value (such as fraudulent, likely human, possibly human). In such implementations, if the user device does not send an encrypted token, the trust measurement engine 224 can store a "Fraudulent" tag along with the stored analytics data. Alternatively, the trust measurement engine 224 can discard—instead of storing—the analytics data 208.

In some scenarios, when the encrypted token is received from the user device 102, the token decryptor 222 may not be able to decrypt this token. This scenario can arise when a spammer generates a fake token and sends that along with spam data to the analytics server 104. In such scenarios, the token decryptor 222 can send a "did not decrypt" message to the trust measurement engine 224. Upon receiving this message, the trust measurement engine 224 can then store this analytics data 208 in the analytics storage device along with a score of 0 in the data structure 228 of the analytics data storage device 226. In some implementations, instead of a score, the data structure 228 can store a binary value (fraudulent or human) or a categorical value (such as fraudulent, likely human, possibly human). In such implementations, if the encrypted token does not decrypt, the trust measurement engine 224 can store a "Fraudulent" tag along with the stored analytics data. Alternatively, the trust measurement engine 224 can discard—instead of storing—the analytics data 208.

A publisher 106 can request reports and analysis based on the collected analytics data that is stored in the analytics data storage device 226. In some implementations, a publisher 106 can use an application (e.g., a browser, native application) to access a portal or page provided by the front-end servers 218 of the analytics server 104. From this portal, the publisher 106 can request analytics operations, such as for example, reports or analysis of the collected analytics data. Upon receiving a request for such analytics operations, the front end-servers 218 send this request to a report generator engine 214. The report generator engine 214 retrieves the relevant analytics data from the analytics data storage device 226 (e.g., page activity and revenues per user) and then performs operations on this data (e.g., summing up revenues, calculating percentages of traffic from certain locations, etc.), as appropriate, for the requested report. In some implementations, the report generator 214 can only retrieve analytics data from the analytics data storage device 226 that has a non-zero score (or alternatively, data that is tagged as Human). In some implementations, the report generator 214 includes all the analytics data (regardless of the score or whether the data was identified as human or fraudulent).

The back-end servers 220 then provide the retrieved and calculated analytics data to the front-end servers 218. The front-end servers 218 format this retrieved and calculated data into a report that the front-end servers 218 then provide on an interface to the application being used by the publisher 106. If the back-end server 220 provides both fraudulent and human analytics data (or all analytics data irrespective of the trust score), the front-end servers 218 can provide reports to the publisher 106 in different formats. In one format, the front-end server 218 can provide two reports to the publisher 106: one report identified as a human analytics data report including analytics data identified as human (or data with scores that satisfied a certain threshold); and another report identified as a fraudulent analytics data report including analytics data identified as fraudulent (or data with scores that did not satisfy a certain threshold). In another format, the front end-servers 218 can provide a single report that includes only analytics data that has been identified as human (or data with scores that satisfied a certain threshold). In yet another format, the front-end servers 218 can provide a single report that includes analytics data that has been identified as both human and fraudulent (or all data irrespective of scores). This type of a report may include a field that identifies whether the data is identified as being human or fraudulent (or identifies the score associated with the data). In any of these formats, the publisher 106 can identify and analyze the authentic, human analytics data and make business decisions based on this authentic data.

Figure 3:
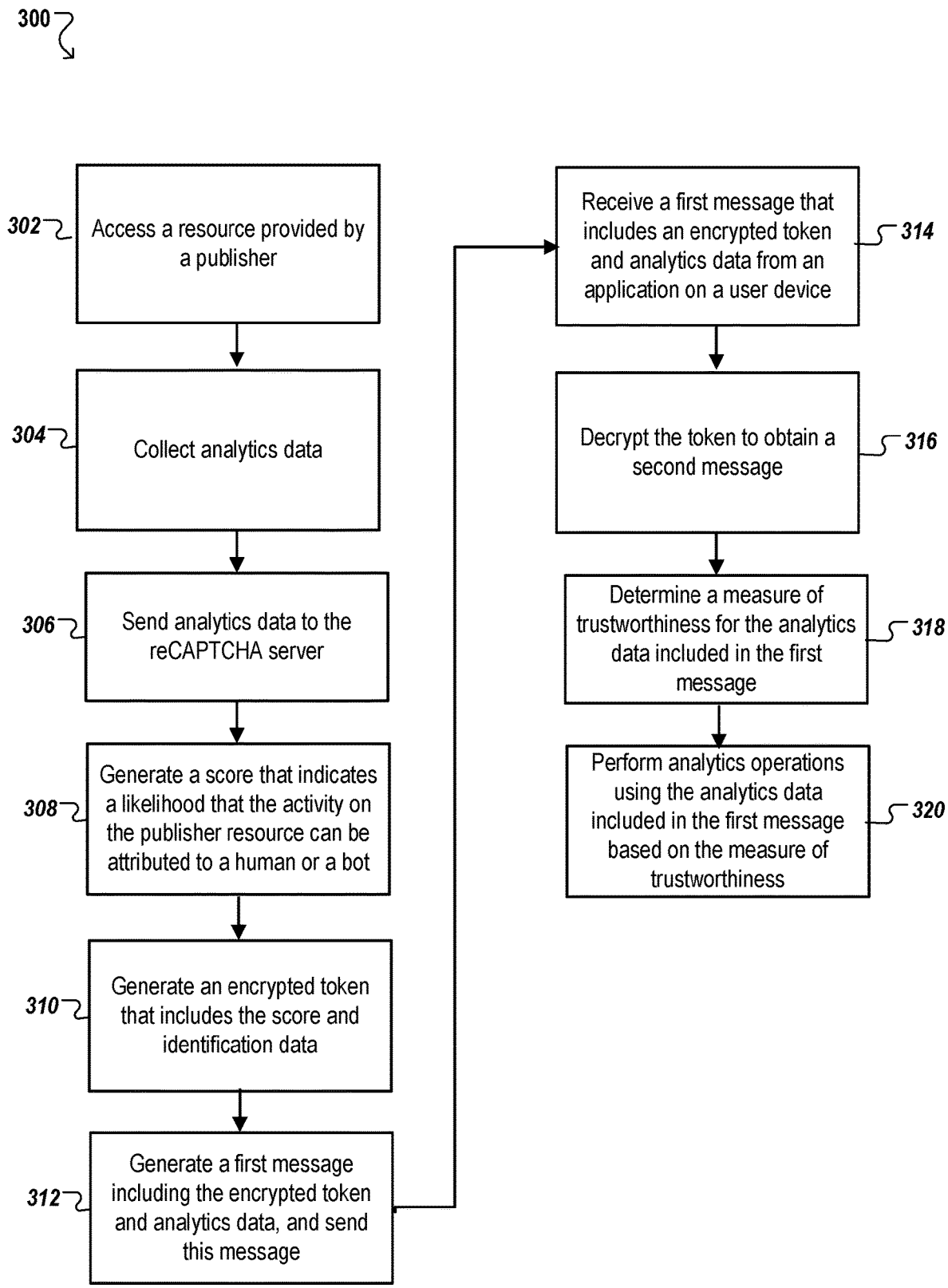
FIG. 3 is a flow diagram of an example process that identifies spam or fraudulent data in analytics data.

FIG. 3 is a flow diagram of an example process that identifies spam or fraudulent data in analytics data. Operations of process 300 are described below as being performed by the components of the system described and depicted in FIGS. 1 and 2. Operations of the process 300 are described below for illustration purposes only. Operations of the process 300 can be performed by any appropriate device or system, e.g., any appropriate data processing apparatus. Operations of the process 300 can also be implemented as instructions stored on a non-transitory computer readable medium. Execution of the instructions cause one or more data processing apparatus to perform operations of the process 300.

A user accesses a publisher 106's resource (e.g., a content page 202 of a website) on an application (e.g., browser, mobile application) executing on a user device 102 (at 302). In some implementations, the content page 202 provided by the publisher 106 includes a script that collects analytics data based on the device's environment as well as the activity and interactions on the content page 202 (as further described above with reference to FIGS. 1 and 2). In the some implementations, the content page 202 also includes code to access a reCAPTCHA server 110 or another risk analysis service.

The user device 102 collects analytics data (at 304) (as further described above with reference to FIGS. 1 and 2).

The user device 102 sends the collected analytics data to a reCAPTCHA server 110 (at 306). In some implementations, the user device 102 sends all the collected analytics data (e.g., analytics data 208) to the reCAPTCHA server 110. In other implementations, the user device 102 only sends a portion of the collected analytics data, such as the session identifier and the client identifier to the reCAPTCHA server 110.

The reCAPTCHA server 110 generates a score that indicates a likelihood that the activity on the resource of the publisher 106 can be attributed to a human or a bot (at 308). In some implementations, upon receiving the analytics data 208 (or a portion of the analytics data 208), the reCAPTCHA server 110 uses a reCAPTCHA algorithm or another suitable risk analysis algorithm to determine whether the received analytics data can be attributed to a human user or a bot (as described above with reference to FIGS. 1 and 2). In some implementations, the reCAPTCHA algorithm (or another suitable risk analysis algorithm) generates a score that indicates the likelihood that the activity on the resource of the publisher 106 can be attributed to a human or a bot. The score may be a numeric score (e.g., a score that a range from 0 to 1), a binary determination (e.g., fraudulent or human), or a categorical value (such as fraudulent, likely human, possibly human) (as described above with reference to FIGS. 1 and 2). In some implementations, instead of analyzing the received analytics data, the reCAPTCHA server 110 interacts with the application on the user device 102 to collect information about the environment and activity/interaction on the publisher 106's resource. Using this information, the reCAPTCHA algorithm (or other suitable risk analysis algorithm) generates a score (as described above with reference to FIGS. 1 and 2).

The reCAPTCHA server generates an encrypted token that includes the generated score and identification data (at 310). As described above with reference to FIGS. 1 and 2, the reCAPTCHA server generates a token using the generated score and the identification data (e.g., session identifier and client identifier) included in the analytics data 208 that was sent to the reCAPTCHA server 110 by the user device 102. The reCAPTCHA server then encrypts this token using an encryption algorithm, e.g., using a symmetric or asymmetric encryption algorithm (as described above with reference to FIG. 2).

The application on the user device 102 generates a first message that includes the encrypted token and the analytics data 208, and sends this first message to the analytics server 104 (at 312). This operation is described above with reference to FIG. 2.

The analytics server 104 receives the first message that includes the encrypted token and analytics data from the application on the user device (at 314). As described above with reference to FIGS. 1 and 2, the analytics server 104 receives a message from a user device 102 that includes analytics data 208. Also, as described above with reference to FIGS. 1 and 2, this message includes an encrypted token 212, which was generated by a reCAPTCHA server 110.

The analytics server 104 decrypts the encrypted token to obtain a second message (at 316). As described above with reference to FIG. 2, the token decryptor 222 decrypts the encrypted token to obtain a second message, which includes a reCAPTCHA score and a portion of the analytics data, which includes the identification data. The reCAPTCHA score is a trust score that indicates the likelihood that the activity on an application is attributed to a human rather than an automated computer process. In some implementations, the identification data includes the session identifier and the client identifier (as described above with reference to FIG. 2).

The analytics server 104 determines a measure of trustworthiness for the analytics data included in the first message (at 318). As described above with reference to FIG. 2, the trust measurement engine 224 determines a measure of trustworthiness based on the reCAPTCHA score as well as a comparison of the analytics event data included in the first message (sent by the user device) and the portion of the analytics data included in the second message (obtained upon decrypting the token). As described above and with reference to FIG. 2, the trust measurement engine 224 compares the identification data included in the first and second messages. In particular, the trust measurement engine 224 determines whether (1) the session identifier in the analytics data included in the first message matches the session identifier in the analytics data included in the second message and (2) the client identifier in the analytics data included in the first message matches the client identifier in the analytics data included in the second message.

As described above with reference to FIG. 2, if all or part of the identification does not match, the trust measurement engine 224 determines that the analytics data is fraudulent. Alternatively, the trust measurement engine 224 assigns a score of 0 to the analytics data, which represents that the analytics data cannot be attributed to a human user.

On the other hand, if all or part of the identification data matches, the trust measurement engine 224 then assigns the reCAPTCHA score to the analytics data (as described above with reference to FIG. 2). Alternatively, the trust measurement engine 224 assigns a fraudulent or human identifier to the analytics data based on the reCAPTCHA score (e.g., assign a human identifier for reCAPTCHA score that satisfies a threshold, assign a fraudulent identifier for reCAPTCHA score that does not satisfy a threshold).

As described above with reference to FIG. 2, there are some scenarios in which the first message may not include a token or if the message includes a token, the token decryptor 222 may not be able to decrypt the token. In such scenarios, the trust measurement engine 224 determines that the analytics data is fraudulent. Alternatively, the trust measurement engine 224 assigns a score of 0 to the analytics data, which represents that the analytics data cannot be attributed to a human user.

In any of the above scenarios, if a numerical score is used to represent the measure of trustworthiness, the trust measurement engine 224 can convert this score to a binary value. As described above with reference to FIG. 2, the trust measurement engine 224 can convert the numerical scores that satisfy a certain trustworthiness threshold to a "human" identifier and those that don't satisfy this threshold to a "fraudulent" identifier.

The analytics server 104 can perform analytics operations using the analytics data included in the first message based on the measure of trustworthiness (at 320). As described above, the trust measurement engine 224 stores the analytics data along with a score or a human/fraudulent identifier. As also described above, the trust measurement engine 224 can convert scores to a human/fraudulent identifier.

The report generator 214 can generate reports and perform analysis on the analytics data based on the score or identification for the analytics data (as described above with reference to FIG. 2). In some implementations, the report generator 214 can generate two reports: one report for analytics data identified as attributable to human user (i.e., either identified as "human" or with a score that satisfies a certain threshold) and the other report based on analytics data identified as fraudulent (i.e., either identified as "fraudulent" or with a score than does not satisfy a certain threshold). In other implementations, the report generator 214 can generate a single report that uses only analytics data attributable to a human user (i.e., either identified as a "human" or with a score that satisfies a certain threshold).

Figure 4:
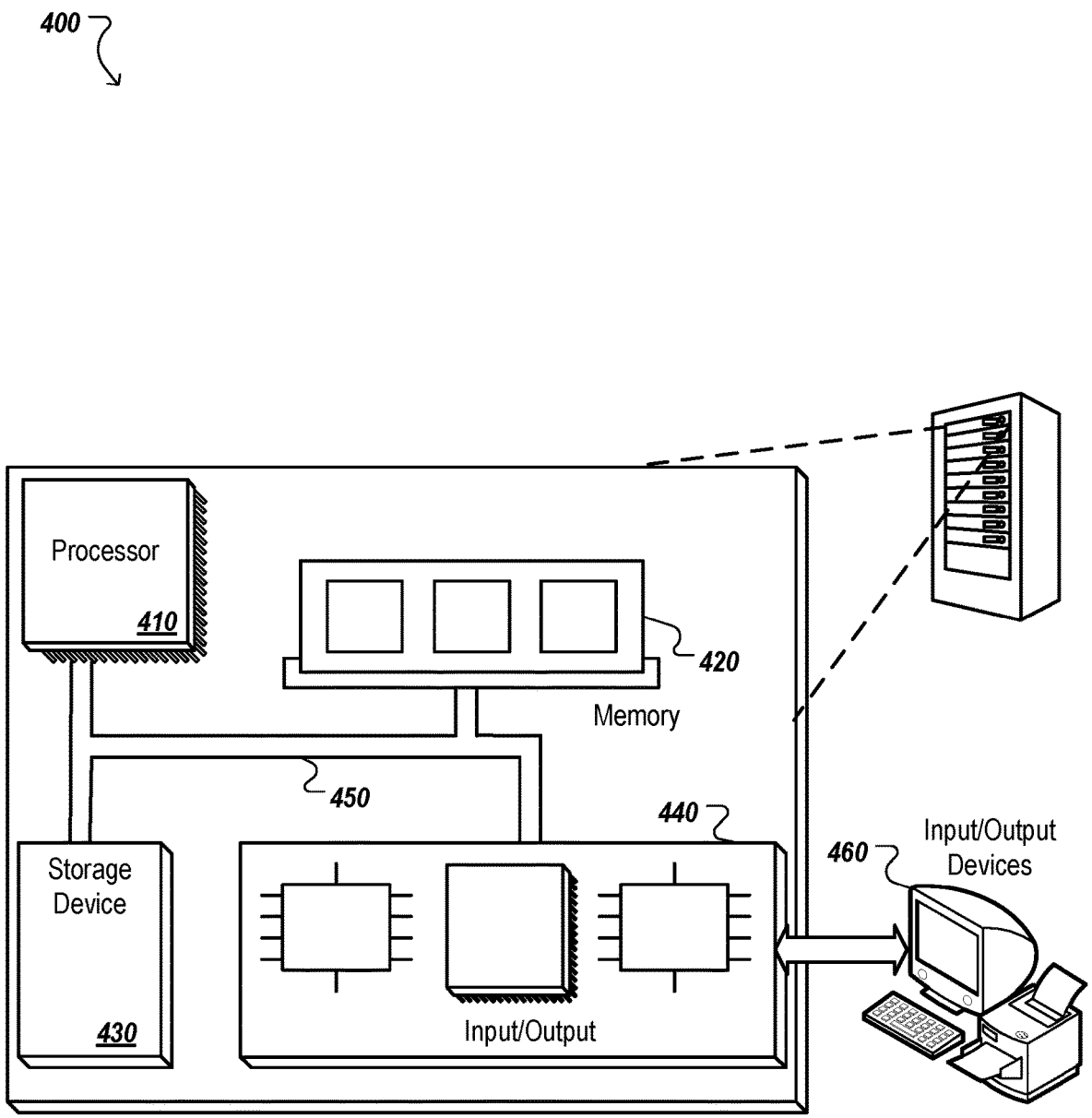
FIG. 4 is a block diagram of an example computer system.

FIG. 4 is block diagram of an example computer system 400 that can be used to perform operations described above. The system 400 includes a processor 410, a memory 420, a storage device 430, and an input/output device 440. Each of the components 410, 420, 430, and 440 can be interconnected, for example, using a system bus 450. The processor 410 is capable of processing instructions for execution within the system 400. In some implementations, the processor 410 is a single-threaded processor. In another implementation, the processor 410 is a multi-threaded processor. The processor 410 is capable of processing instructions stored in the memory 420 or on the storage device 430.

The memory 420 stores information within the system 400. In one implementation, the memory 420 is a computer-readable medium. In some implementations, the memory 420 is a volatile memory unit. In another implementation, the memory 420 is a non-volatile memory unit.

The storage device 430 is capable of providing mass storage for the system 400. In some implementations, the storage device 430 is a computer-readable medium. In various different implementations, the storage device 430 can include, for example, a hard disk device, an optical disk device, a storage device that is shared over a network by multiple computing devices (e.g., a cloud storage device), or some other large capacity storage device.

The input/output device 440 provides input/output operations for the system 400. In some implementations, the input/output device 440 can include one or more of a network interface devices, e.g., an Ethernet card, a serial communication device, e.g., and RS-232 port, and/or a wireless interface device, e.g., and 802.11 card. In another implementation, the input/output device can include driver devices configured to receive input data and send output data to other input/output devices, e.g., keyboard, printer and display devices 460. Other implementations, however, can also be used, such as mobile computing devices, mobile communication devices, set-top box television client devices, etc.

Although an example processing system has been described in FIG. 4, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage media (or medium) for execution by, or to control the operation of, data processing apparatus. Alternatively, or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field-programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field-programmable gate array) or an ASIC (application-specific integrated circuit).

Processors suitable for the execution of a computer program include, by way of example, both general and special purpose microprocessors. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
   obtaining, by a user device and for a content page displayed within an application executing on the user device, analytics data including data representing user interactions with the content page;
   routing, by the user device, the analytics data to a trust verification server;
   receiving, from the trust verification server, a token representing at least a portion of the analytics data and a trustworthiness score generated by the trust verification server, wherein the trustworthiness score indicates whether the user interactions with the content page are attributed to a human user or an automated computing process; and
   routing, by the user device to an analytics server, the token received from the trust verification server and the analytics data obtained by the user device, wherein the token and the analytics data enable verification of the analytics data prior to performance of analytics operations by the analytics server.

2. The computer-implemented method of claim 1, wherein the trustworthiness score is based on a comparison of a first set of identification data from the token and a second set of identification data from the analytics data.

3. The computer-implemented method of claim 2, wherein the first set of identification data comprises a first set of location data from the token and the second set of identification data comprises a second set of location data related to the user device from the analytics data, wherein the first set of location data and the second set of location data indicate a location corresponding to at least one of (i) the user device, or (ii) the user interactions with the content page.

4. The computer-implemented method of claim 1, wherein obtaining the analytics data comprises:
   obtaining, by the user device and upon execution of a script embedded in the content page, the analytics data that includes data related to the user device.

5. The computer-implemented method of claim 4, wherein the data related to the user device comprises at least one of (i) a device type, (ii) a device location, or (iii) a device screen resolution, for the user device during which the user interactions with the content page were obtained.

6. The computer-implemented method of claim 4, wherein the data related to the user device comprises a record of at least one of (i) interactive elements, (ii) interactions, or (iii) transactions, associated with the user device during which the user interactions with the content page were obtained.

7. The computer-implemented method of claim 1, wherein the trustworthiness score is generated by the trust verification server using a risk analysis algorithm to determine the trustworthiness score.

8. The computer-implemented method of claim 7, wherein the trust verification server encrypts the token by using at least one cryptographic algorithm, the at least one cryptographic algorithm configured to generate a key for the token.

9. The computer-implemented method of claim 1, wherein obtaining the analytics data comprises:
   obtaining, by the user device and upon execution of a script embedded in the content page, the analytics data that includes (1) the data representing the user interactions with the content page, (2) a user device identifier, and (3) a web session identifier that identifies a web session during which the user interactions with the content page were obtained.

10. The computer-implemented method of claim 1, further comprising:
    storing, by the user device, the analytics data in a user device data store; and
    wherein routing the analytics data to the trust verification server includes routing the analytics data stored in the user device data store to the trust verification server.

11. The computer-implemented method of claim 1, wherein the analytics data is a first set of analytics data and the method further comprising:
    routing, by the user device and to the analytics server, data including a second set of analytics data different from the first set of analytics data, wherein:
    the data does not include any token received from the trust verification server; and
    absence of a token in the data results in no analytics operations being performed on the second set of analytics data by the analytics server.

12. The computer-implemented method of claim 1, wherein the analytics data is a first set of analytics data and the method further comprising: routing, by the user device and to the analytics server, data including a second set of analytics data different from the first set of analytics data, wherein:
    the data includes a second token received from the trust verification server with a corresponding trustworthiness score indicating the user interactions with the content page are attributed to a second automated computing process;

determining, based on the second set of analytics data and the analytics server, that the second token received from the trust verification server is attributed to the second automated computing process; and in response to determining that the token received from the trust verification server is attributed to the second automated computing process, no analytics operations are performed on the second set of analytics data by the analytics server.

13. A system, comprising:

one or more memory devices storing instructions; and one or more processors that are configured to interact with the one or more memory devices, and upon execution of the instructions, perform operations including:

obtaining, by a user device and for a content page displayed within an application executing on the user device, analytics data including data representing user interactions with the content page;

routing, by the user device, the analytics data to a trust verification server;

receiving, from the trust verification server, a token representing at least a portion of the analytics data and a trustworthiness score generated by the trust verification server, wherein the trustworthiness score indicates whether the user interactions with the content page are attributed to a human user or an automated computing process; and routing, by the user device to an analytics server, the token received from the trust verification server and the analytics data obtained by the user device, wherein the token and the analytics data enable verification of the analytics data prior to performance of analytics operations by the analytics server.

14. The system of claim 13, wherein the trustworthiness score is based on a comparison of a first set of identification data from the token and a second set of identification data from the analytics data, the first set of identification data comprising a first set of location data from the token and the second set of identification data comprising a second set of location data related to the user device from the analytics data, wherein the first set of location data and the second set of location data indicate a location corresponding to at least one of (i) the user device, (ii) the user interactions with the content page.

15. The system of claim 13, wherein obtaining the analytics data comprises:

obtaining, by the user device and upon execution of a script embedded in the content page, the analytics data that includes data related to the user device.

16. The system of claim 13, wherein the one or more processors are configured to perform operations further comprising:

storing, by the user device, the analytics data in a user device data store; and wherein routing the analytics data to the trust verification server includes routing the analytics data stored in the user device data store to the trust verification server.

17. A non-transitory computer readable medium storing instructions that, when executed by one or more processors, cause the one or more processors to perform operations comprising:

obtaining, by a user device and for a content page displayed within an application executing on the user device, analytics data including data representing user interactions with the content page;

routing, by the user device, the analytics data to a trust verification server;

receiving, from the trust verification server, a token representing at least a portion of the analytics data and a trustworthiness score generated by the trust verification server, wherein the trustworthiness score indicates whether the user interactions with the content page are attributed to a human user or an automated computing process; and routing, by the user device to an analytics server, the token received from the trust verification server and the analytics data obtained by the user device, wherein the token and the analytics data enable verification of the analytics data prior to performance of analytics operations by the analytics server.

18. The non-transitory computer readable medium of claim 17, wherein the trustworthiness score is based on a comparison of a first set of identification data from the token and a second set of identification data from the analytics data, the first set of identification data comprising a first set of location data from the token and the second set of identification data comprising a second set of location data related to the user device from the analytics data, wherein the first set of location data and the second set of location data indicate a location corresponding to at least one of (i) the user device, (ii) the user interactions with the content page.

19. The non-transitory computer readable medium of claim 17, wherein obtaining the analytics data comprises:

obtaining, by the user device and upon execution of a script embedded in the content page, the analytics data that includes data related to the user device.

20. The non-transitory computer readable medium of claim 17, wherein the one or more processors are configured to perform operations further comprising:

storing, by the user device, the analytics data in a user device data store; and wherein routing the analytics data to the trust verification server includes routing the analytics data stored in the user device data store to the trust verification server.

* * * * *